United States Patent
Thienot et al.

(10) Patent No.: US 10,560,866 B2
(45) Date of Patent: Feb. 11, 2020

(54) METHOD OF HANDLING PACKET LOSSES IN TRANSMISSIONS BASED ON DASH STANDARD AND FLUTE PROTOCOL

(71) Applicants: EXPWAY, Paris (FR); INSTITUT MINES-TELECOM, Paris (FR)

(72) Inventors: Cédric Thienot, Paris (FR); Jean Le Feuvre, Cachan (FR)

(73) Assignees: EXPWAY, Paris (FR); INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/548,747

(22) PCT Filed: Apr. 24, 2015

(86) PCT No.: PCT/IB2015/052992
§ 371 (c)(1),
(2) Date: Aug. 3, 2017

(87) PCT Pub. No.: WO2016/128803
PCT Pub. Date: Aug. 18, 2016

(65) Prior Publication Data
US 2018/0098242 A1    Apr. 5, 2018

Related U.S. Application Data

(60) Provisional application No. 62/114,868, filed on Feb. 11, 2015.

(51) Int. Cl.
*H04W 28/04*    (2009.01)
*H04L 29/06*    (2006.01)
(Continued)

(52) U.S. Cl.
CPC ........... *H04W 28/04* (2013.01); *H04L 1/0083* (2013.01); *H04L 65/4076* (2013.01);
(Continued)

(58) Field of Classification Search
CPC ..... H04L 1/0083; H04L 65/608; H04L 65/80; H04L 65/4076; H04L 65/607; H04W 28/065
See application file for complete search history.

(56) References Cited

U.S. PATENT DOCUMENTS

2006/0268841 A1    11/2006 Nagaraj et al.
2006/0288027 A1*   12/2006 Murakami ......... G11B 27/3027
(Continued)

OTHER PUBLICATIONS

Oct. 23, 2015 International Search Report issued in International Patent Application No. PCT/IB2015/052992.
(Continued)

*Primary Examiner* — Thai Nguyen
(74) *Attorney, Agent, or Firm* — Oliff PLC

(57) ABSTRACT

A method of retrieving a file, the method including: receiving a portion of a content transmitted in accordance with a multicast protocol via a file delivery service, wherein the content includes data fragments forming a file; receiving a file delivery table (FDT) from the file delivery service; reading in the file delivery table location attributes indicating locations of the data fragments in the file; and determining from the location attributes locations of non-corrupted data fragments in the content portion.

18 Claims, 3 Drawing Sheets

(51) Int. Cl.
  *H04L 1/00* (2006.01)
  *H04W 28/06* (2009.01)
(52) U.S. Cl.
  CPC .......... *H04L 65/607* (2013.01); *H04L 65/608* (2013.01); *H04L 65/80* (2013.01); *H04W 28/065* (2013.01)

(56) References Cited

U.S. PATENT DOCUMENTS

| | | |
|---|---|---|
| 2013/0254611 A1 | 9/2013 | Amerga et al. |
| 2013/0254634 A1* | 9/2013 | Luby ...................... H04L 67/06 714/776 |
| 2014/0173677 A1 | 6/2014 | Lohmar et al. |
| 2015/0172348 A1* | 6/2015 | Lohmar ................ H04L 65/607 709/219 |

OTHER PUBLICATIONS

Oct. 23, 2015 Written Opinion of the International Searching Authority issued in International Patent Application No. PCT/IB2015/052992.

\* cited by examiner

US 10,560,866 B2

METHOD OF HANDLING PACKET LOSSES IN TRANSMISSIONS BASED ON DASH STANDARD AND FLUTE PROTOCOL

BACKGROUND OF THE INVENTION

Aspects of the present disclosure may relate to reducing the effects of transmission failures when transmitting content such as video in an environment such as Dynamic Adaptive Streaming over HTTP (DASH) over File Delivery over Unidirectional Transport (FLUTE) environment.

Wireless communication networks are widely deployed to provide various communication services such as voice, video, packet data, messaging, broadcast, etc. These wireless networks are generally multiple-access networks capable of supporting multiple users by sharing the available network resources.

A wireless communication network may include a number of base stations that can support communication for a number of user equipments also referred to as mobile entities. A user equipment may communicate with a base station via a downlink and an uplink. The downlink (or forward link) refers to the communication link from the base station to the user equipment, and the uplink (or reverse link) refers to the communication link from the user equipment to the base station.

The third Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations and mobile entities. In prior applications, a method for facilitating high bandwidth communication for multimedia has been single frequency network (SFN) operation. SFNs utilize radio transmitters, such as, for example, those in base stations, to communicate with subscriber equipments. In unicast operation, each base station is controlled so as to transmit signals carrying information directed to one or more particular subscriber equipment.

In broadcast operation, several base stations in a broadcast area may broadcast signals in a synchronized fashion, carrying information that can be received and accessed by any subscriber equipment in the broadcast area. The generality of broadcast operation enables greater efficiency than unicast service in transmitting information of general public interest, for example, event-related multimedia broadcasts. As the demand and system capability for event-related multimedia and other broadcast services has increased, system operators have shown increasing interest in making use of broadcast operation in 3GPP networks.

Transmission of content, such as video content, may be performed by various methods in communication networks. In the case of video content, for example, transmission of video information from a video source to a display can be made via unicast transmissions or multicast/broadcast transmissions. Unicast transmissions are directed to a specifically targeted receiving device. To obtain a unicast transmission, a target device may have a Uniform Resource Locator (URL) with the address of the video source, and may generate an HTTP GET command that it may send to the video source (typically a server) to facilitate download of the video file.

A known method for transmission of video in a unicast environment is through Dynamic Adaptive Streaming over HTTP (DASH). Use of DASH in unicast obtains the entire file. DASH may convert the video file into smaller components called DASH segments, which may be reassembled at the receiving device to display the desired video.

Multicast or broadcast transmissions, such as in Evolved-Multimedia Broadcast/Multicast Service (eMBMS), present different considerations, as the transmissions are sent to multiple receiving devices. In these environments, the receiving devices can obtain information before the associated system actually takes steps to obtain that information. The receiving device may store that received information in a local cache. When the system (typically at the application layer) generates a URL to obtain the information, the generated URL may point to content already in the local cache rather than at the server side as in the unicast environment.

DASH in combination with File Delivery over Unidirectional Transport (FLUTE) may be used in multicast environments. According to such a combination, video content may be converted into DASH segments and small groups of DASH segments may be accumulated by a FLUTE package engine (FPE), which in turn may convert the DASH segments into FLUTE packets for transmission. The structure of the DASH segments conforms to the ISO Base Media File Format (ISOBMFF). According to ISOBMFF, a segment is divided into boxes. A movie fragment comprises at least one header box called "moof" for "movie fragment", associated with a data box called "mdat" for "movie data", the box moof specifying the structure of the box mdat.

DASH, and most ISOBMFF-based adaptive streaming technologies, usually assumes an error-free transport layer. However, deployments such as eMBMS may rely on multicast User Datagram Protocol (UDP) or other broadcast data link layers such as DVB-GSE (Digital Video Broadcasting-Generic Stream Encapsulation) for the delivery of DASH segments. Although error correction coding techniques such as FEC (Forward Error Correction) are heavily used in these environments, loosing a complete packet is not dealt with by a eMBMS/FLUTE/DVB receiver.

In the worst case, when a loss is detected, the corrupted DASH segment is considered lost, and the DASH session will have a long playback interruption. However a DASH session based on the protocol MPEG-2 Transport Stream (TS) would not suffer such a loss, as TS is designed for lossy environments, i.e. loosing a few TS packets will not corrupt the whole segment. In the case of a DASH session based on ISOBMFF format, when the loss is only located in a data part (box mdat) of a segment, only a few samples (or even few blocks of a video slice) are lost, and the rest of the segment is usable. In contrast, when the lost is located in a header part (box moof), the end of the segment following the corrupted box moof is not usable. If the receiving device is coupled to a segment reader and thus does not process the DASH segment, loss information has to be communicated to the segment reader. Such losses could be handled by the receiving device.

However a receiving device based on MSE (Media Source Extension), JavaScript and HTML5 will very likely not know anything about the underlying delivery protocol, whether HTTP broadband or FLUTE. In addition, the receiving device could be a different device than the media player, for example a DASH eMBMS connected to a Wifi relay. In both cases, it may not be desirable for the receiving device to handle reformatting of a corrupted segment, for complexity reasons. Moreover, reformatting a corrupted segment would make further repair of the segment by a third-party device not possible, since it would not be aware of the loss.

Additionally, there are cases where the corrupted data are located within a header box moof, which makes the box, and consequently the remainder (box mdat) of the movie fragment, unusable. However, if the segment is not made of a single fragment (single moof box associated with a sign-lemdat box), but of several fragments each comprising a moof box and an associated mdat box, some other fragments could be intact after the corrupted box moof. In case the size data in the corrupted box moof is corrupted, all the fragments (boxes moof and mdat) following the corrupted box moof are lost since the positions in the segment of the boxes moof cannot be determined.

Thus it is desirable to handle partially corrupted fragments. It is further desirable to handle the case of a segment composed of multiple fragments with one fragment partially or totally corrupted, so as to enable processing of non-corrupted fragments following a corrupted fragment within a segment. It is also desirable to respect existing DASH deployments, and thus to ensure a backward compatibility so as to avoid disturbing or render inoperative the function of the existing user equipment to handle corrupted or not corrupted segments.

BRIEF SUMMARY OF THE INVENTION

Embodiments of the invention relate to a method of retrieving a file, the method comprising: receiving a portion of a content transmitted in accordance with a multicast protocol via a file delivery service, wherein the content comprises data fragments forming a file; receiving a file delivery table (FDT) from the file delivery service; reading in the file delivery table location attributes indicating locations of the data fragments in the file; and determining from the location attributes locations of non-corrupted data fragments in the content portion.

According to an embodiment, the method comprises: detecting corrupted data in the content portion; and removing the content portion containing corrupted data from the file.

According to an embodiment, the method comprises: detecting corrupted data in the content portion; and encapsulating the content portion into a container box comprising payload data including the content portion with corrupted data, and header data including location data for locating the corrupted data in the content portion.

According to an embodiment, the method comprises: determining a type of the container box from the header data, the type of the container box indicating that the container box contains corrupted data; determining location data in the header data; determining from the location data in the header data locations of non-corrupted data of the content portion in the payload data; and using the non-corrupted data.

According to an embodiment, the method comprises: inserting into the header data of the container box containing the corrupted data, the location attributes read in the file delivery table.

According to an embodiment, the method comprises: reading the location attributes in the header data of the container box, using the location attributes to retrieve the data fragments in the file; and using data in the retrieved data fragments.

According to an embodiment, the method comprises inserting into the header data of the container box containing the corrupted data, a location address where the file is available for downloading.

According to an embodiment, the content is transmitted according to an adaptive data streaming network protocol such as dynamic adaptive streaming over HTTP (DASH).

According to an embodiment, the file delivery service comprises File Delivery over Unidirectional Transport (FLUTE).

Embodiments also relate to a data receiver configured to implement the method defined above.

Embodiments also relate to a method of transmitting data, the method comprising: transmitting a portion of a content in accordance with a multicast protocol via a file delivery service, wherein the content comprises data fragments forming a file; inserting data fragment location attributes for locating a data fragment in the file, into the file delivery table; and transmitting the file delivery table (FDT).

According to an embodiment, the content is transmitted according to an adaptive data streaming network protocol such as dynamic adaptive streaming over HTTP (DASH).

According to an embodiment, the file delivery service comprises File Delivery over Unidirectional Transport (FLUTE).

Embodiments also relate to a data transmitter configured to implement the transmission method as defined above.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
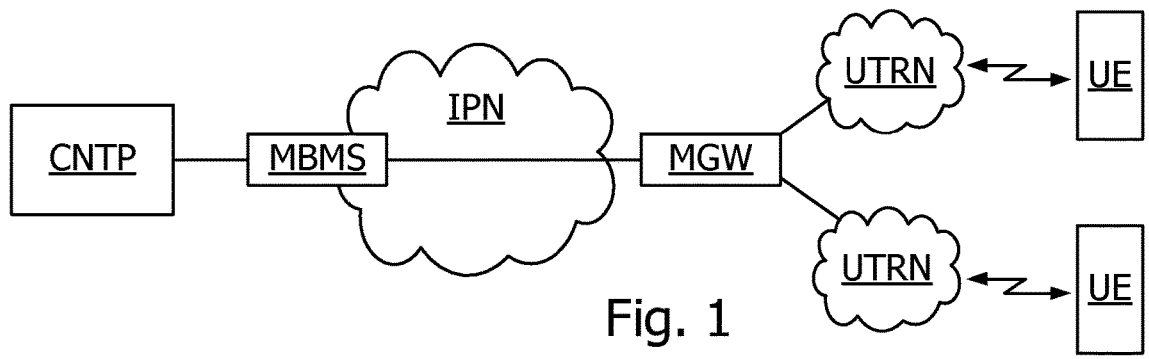
FIG. 1 is a block diagram of a system providing a multicast or broadcast service of media data over a network.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In general, this disclosure concerns techniques related to streaming and file delivery services of multimedia data, such as audio and video data, over a network. These techniques, which may be used in conjunction with dynamic adaptive streaming over HTTP (DASH), include streaming video data, which has been encapsulated according to ISO Base Media File Format (ISOBMFF), using a multicast or broadcast protocol over a file delivery service, such as the File Delivery over Unidirectional Transport (FLUTE) protocol. FLUTE builds on the asynchronous layered coding (ALC) protocol, which provides reliable transport, and thus, FLUTE may also be referred to as FLUTE/ALC.

Additional file delivery protocols, which may be used in place of FLUTE, include FCAST and raw ALC/LCT (e.g., using ALC and LCT headers to deliver file attributes such a file type, encoding, and compression attributes. FCAST is described in Roca, "FCAST: Scalable Object Delivery for the ALC and NORM protocols," IETF RMT Working Group, October 2011. ALC is described in Luby et al., "Asynchronous Layered Coding (ALC) Protocol Instantiation," RFC 5775, April 2010. LCT is described in Luby et al, "Layered Coding Transport (LCT) Building Block," RFC 5651, October 2009. Other protocols for large-scale file broadcast download include the IEEE 802.1E System Load Protocol which broadcasts files at the MAC layer. In IP-based mobile broadcast TV systems, such as DVB-H, ATSC-M/H, 3GPP MBMS (multimedia broadcast multicast services), 3GPP2 BCMCS (broadcast and multicast service), streaming and file delivery services are delivered using different transport protocols. Streaming services delivery employs RTP (in accordance with RFC 3550), whereas file delivery services include FLUTE/ALC (in accordance with RFC 3926 and RFC 5775, respectively). Unicast-based adaptive HTTP streaming services are currently the dominant technology in the Internet for video delivery, and is being standardized in 3GPP [TS 26.247] and MPEG [ISO/IEC FCD 23001-6], generally referred to as DASH (Dynamic Adaptive Streaming over HTTP).

Broadcast streaming delivery may also utilize a file delivery service, such as the FLUTE protocol documented in RFC 6726. The file delivery service may operate over a broadcast media access control (MAC) protocol, such as enhanced Multimedia Broadcast Multicast Service (eM-BMS), which is based on LTE technology, or a multicast protocol such as IP Multicast. Both streaming and file contents are carried by a single application transport protocol (e.g., FLUTE). Furthermore, by employing DASH as the continuous media "file" structure to carry streaming contents in FLUTE/ALC packets, service continuity from broadcast to unicast delivery simply involves a switch from transporting DASH segments over FLUTE/broadcast to HTTP/unicast.

The ISO Base Media File Format (ISOBMFF) is designed to contain timed media information for a presentation in a flexible, extensible format that facilitates interchange, management, editing, and presentation of the media. ISOBMFF format (ISO/IEC 14496-12:2012), specified in MPEG-4 Part-12, defines a general structure for time-based media files. It is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISOBMFF format contains timing, structure, and media information for timed sequences of media data, such as audio-visual presentations. The file structure is generally object-oriented. A file can be decomposed into basic objects very simply and the structure of the objects is implied from their type.

Files conforming to the ISOBMFF format (and extensions thereof) may be formed as a series of objects, called "boxes", which are object-oriented building blocks defined by a unique type identifier and length data defined in the ISOBMFF format and also contained in boxes, such that no other data needs to be contained within the file and there need not be data outside of boxes within the file. Typically, a media presentation is contained in one file, and the media presentation is self-contained. The movie container (movie box) may contain the metadata of the media and the video and audio frames may be contained in the media data container and could be in other files. A representation (motion sequence) may be contained in several files, also referred to as segments in DASH. Timing and framing (position and size) information is generally in the ISO base media file and the ancillary files may essentially use any format. This representation may be 'local' to the system containing the representation, or may be provided via a network or other stream delivery mechanism.

FIG. 1 represents a system providing broadcast multicast streaming and/or file delivery services of multimedia data MBMS (Multimedia Broadcast Multicast Service). This system comprises one or more content servers CNTP, one or more networks IPN such as Internet, one or more servers MBMS implementing a MBMS or eMBMS service, linked to one of the servers CNTP via one of the network IPN, one or more gateways MGW between the server MBMS and mobile networks UTRN, and user or client devices UE each connected to one of the mobile networks UTRN. One of the servers CNTP transmits multimedia content, for example according to MPEG-DASH.

Figure 2:
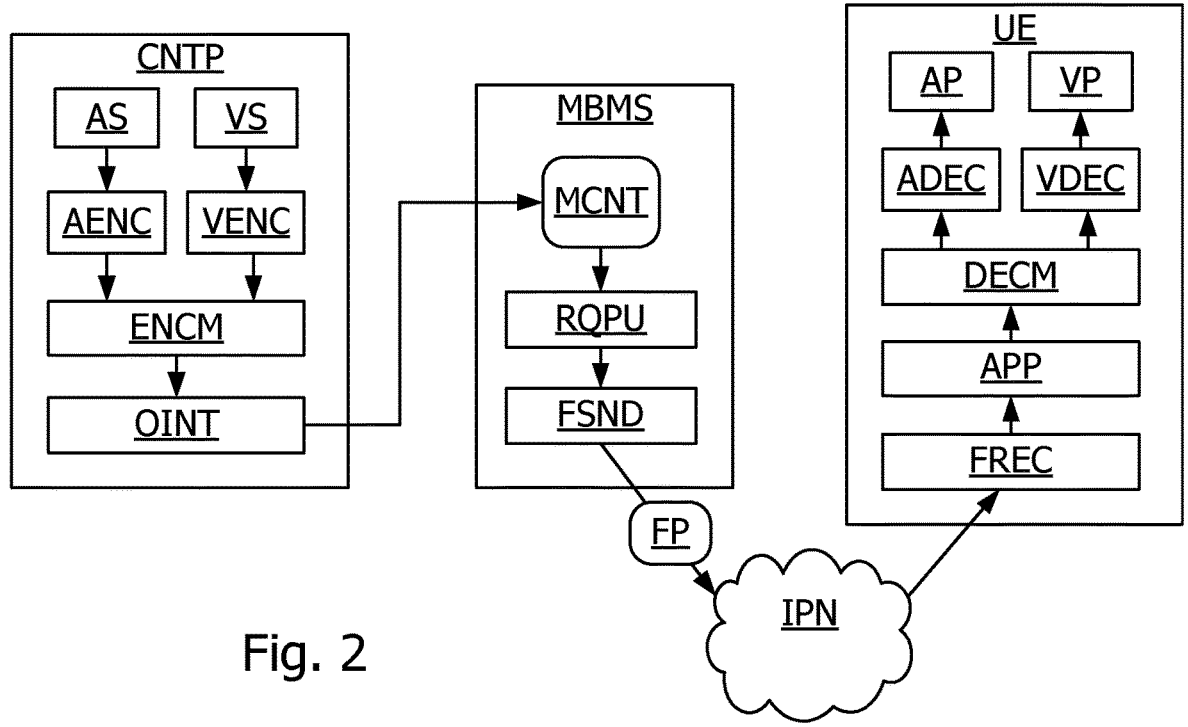
FIG. 2 is a block diagram of a detailed view of the system of FIG. 1.

FIG. 2 is an exemplary detailed block diagram of the system of FIG. 1. In this example, the server CNTP comprises an audio source AS and a video source VS. The audio source AS may comprise, for example, a microphone that produces electrical signals representative of captured audio data to be encoded by an audio encoder AENC. Alternatively, the audio source AS may comprise a storage medium storing previously recorded audio data, an audio data generator such as a computerized synthesizer, or any other source of audio data. The video source VS may comprise a video camera that produces video data to be encoded by a video encoder VENC, a storage medium encoded with previously recorded video data, a video data generation unit such as a computer graphics source, or any other source of video data. The server CNTP is not necessarily communicatively coupled to the server MBMS in all examples, but may store multimedia content to a separate medium that is read by server MBMS.

Raw audio and video data produced by the audio and video sources may comprise analog or digital data. Analog data may be digitized before being encoded by the audio encoder AENC and/or video encoder VENC. The audio source AS may comprise a computer-readable storage medium comprising stored audio data, and the video source VS may comprise a computer-readable storage medium comprising stored video data. In this manner, the techniques described in this disclosure may be applied to live, streaming, real-time audio and video data or to archived, pre-recorded audio and video data.

The audio encoder AENC generally produces a stream of encoded audio data, while the video encoder VENC produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream before being encapsulated within a video file. Coded video data generally corresponds to elementary video streams. Similarly, audio data corresponds to one or more respective elementary streams. The video encoder VENC may apply a compression processing to the video data Video a compression processing according to a compression standard such as ITU-T H.261, H.262, H.263, MPEG-1, MPEG-2, H.264/MPEG-4 part 10.

In the example of FIG. 2, the server CNTP comprises an encapsulation unit ENCM which receives elementary streams comprising coded video data from the video encoder VENC and coded audio data from the audio encoder AENC. The encapsulation unit ENCM forms corresponding network abstraction layer units from the elementary streams. The encapsulation unit ENCM may provide data for one or more representations of multimedia content, along with a manifest file (e.g., the MPD) to an output interface OINT. The output interface OINT may comprise a network interface or an interface for writing to a storage medium, such as a universal serial bus (USB) interface, a CD or DVD writer or burner, an interface to magnetic or flash storage media, or other interfaces for storing or transmitting media data. The encapsulation unit ENCM may provide data of each of the representations of a corresponding multimedia content to the output interface OINT, which may send the data to server MBMS via network transmission or storage media.

The server MBMS may implement one or more broadcast or multicast protocols to broadcast or multicast multimedia data. In the example of FIG. 2, the server MBMS may include a storage medium that stores various multimedia contents MCNT, a request processing unit RQPU 70 and a network interface FSND. In some examples, the server MBMS may include a plurality of network interfaces, including the network interface FSND. Furthermore, any or all of the features of server device MBMS may be implemented on other devices of a content distribution network, such as routers, bridges, proxy devices, switches, or other devices. In some examples, intermediate devices of a content distribution network may cache data of multimedia content MCNT, and include components that conform substantially to those of the server MBMS. In general, the network interface FSND is configured to send and receive data via the network IPN.

In the example of DASH, there may be multiple representations for a multimedia content. The manifest of such representations is defined in a Media Presentation Description MPD data structure. A media presentation may correspond to a structured collection of data that is accessible to an HTTP streaming client device. The HTTP streaming client device may request and download media data information to present a streaming service to a user of the client device. The MPD data structure describes coding and rendering characteristics of each representation. In addition, a server device may provide data that describes characteristics of a broadcast or a multicast, e.g., to provide sufficient information for a client device to receive the broadcast or multicast. For example, the data may include a multicast address that client devices may use to join the multicast.

The multimedia contents MCNT may include a manifest file and one or more representations. In some examples, representations may be separated into adaptation sets. That is, various subsets of representations may include respective common sets of characteristics. The manifest file may include data indicative of the subsets of representations corresponding to particular adaptation sets, as well as common characteristics for the adaptation sets. The manifest file may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file.

The request processing unit RQPU is configured to receive network requests from client devices UE, for data content MNCT. For example, the request processing unit RQPU may implement hypertext transfer protocol (HTTP) version 1.1, as described in RFC 2616, "Hypertext Transfer Protocol-HTTP/1.1," by R. Fielding et al, Network Working Group, IETF, June 1999. That is, the request processing unit RQPU may be configured to receive HTTP GET or partial GET requests and provide data of multimedia content MCNT in response to the requests. The requests may specify a segment of one of representations, e.g., using a URL of the segment. In some examples, the requests may also specify one or more byte ranges of the segment. In some examples, byte ranges of a segment may be specified using partial GET requests.

The request processing unit RQPU may further be configured to service HTTP HEAD requests to provide header data of a segment of one of representations. In any case, the request processing unit RQPU may be configured to process the requests to provide requested data to a requesting device, such as client device UE.

The network interface FSND may be configured to receive the DASH segments from the request processing unit RQPU, and convert them into FLUTE packets FP. The network interface FSND may fragment a DASH segment over one or more FLUTE packets. The conversion into FLUTE packets FP involves a FEC (forward error correction) encoding to encode the DASH segments with redundant data enabling transmission error correction. In order to correlate the FLUTE packets FP with the DASH segments, the network interface FSND may assign one Transmission Object Identifier (TOI) for each segment. One segment may be considered as one file, and the segment URL can be the same as the file name of a FLUTE file identified by the TOI. The network interface FSND may generate a File Delivery Table (FDT) instance to describe attributes for those DASH segments. Attributes of DASH segments may include a file name (specified by, e.g., a URL), a file type (e.g., MIME media type of the file), a size of the file, a message digest of the file (e.g. MD5), information relative to FEC processing, and an encoding format of the file. The table FDT may transmitted in one or more of the FLUTE packets FP sent by the network interface FSND.

The client device UE may comprise a file receiver FREC, a web application APP, a decapsulation unit DECM, and content decoders and players such as audio and video decoders ADEC, VDEC, and audio and video players AP, VP. The file receiver may comprise a FLUTE receiver and a FEC decoder, to implement a file delivery protocol, such as the FLUTE protocol. In this manner, the client device UE may be configured to retrieve data of the multimedia content MCNT using broadcast or multicast via the FLUTE protocol. To utilize FLUTE as a file delivery service, the server MBMS may insert in the File Delivery Table (FDT) attributes indicating one or more unicast uniform resource locators (URLs) for the media content MCNT to the client device UE. The file receiver FREC may receive data, whether by broadcast, multicast, or unicast, sent from the server device MBMS (or another server device). In particular, the file receiver FREC may receive FLUTE packets and provide data of received segments of representations to the web application APP. The web application APP may in turn provide the DASH segments to the decapsulation unit DECM. The decapsulation unit DECM may decapsulate elements of a video file transmitted in file segments into constituent streams, depacketize the streams to retrieve encoded data, and send the encoded data to either the audio decoder ADEC or video decoder VDEC, depending on whether the encoded data is part of an audio or video stream, e.g., as indicated by packet headers of the stream. The audio decoder ADEC decodes encoded audio data and sends the decoded audio data to the audio player VP, while video decoder VDEC decodes encoded video data and sends the decoded video data, which may include a plurality of views of a stream, to the video player VP.

The web application APP may comprise a web browser executed by a hardware-based processing unit of the client device UE, or a plug-in to such a web browser. References to the web application APP should generally be understood to include either a web application, such as a web browser, a standalone video player, or a web browser incorporating a playback plug-in to the web browser. The web application APP may retrieve configuration data within the client device UE to determine decoding capabilities of the audio and video decoders ADEC, VDEC and rendering capabilities of the audio and video players AP, VP.

The configuration data may also include any or all of a language preference selected by a user of the client device UE, one or more camera perspectives corresponding to depth preferences set by the user of client device UE, and/or a rating preference selected by the user of the client device UE. The web application APP may compare the decoding and rendering capabilities of the client device UE to characteristics of representations indicated in the manifest file. The web application APP may initially retrieve at least a portion of the manifest file to determine characteristics of representations. For example, the web application APP may request a portion of the manifest file that describes characteristics of one or more adaptation sets. The web application APP may select a subset of representations (e.g., an adaptation set) having characteristics that can be satisfied by the coding and rendering capabilities of the client device UE. The web application APP may then determine bitrates for representations in the adaptation set, determine a currently available amount of network bandwidth, and retrieve segments (or byte ranges) from one of the representations having a bit rate that can be satisfied by the network bandwidth.

The web application APP may be configured to request and receive broadcast or multicast data sent by the server MBMS. For example, the web application APP may be configured to initially retrieve data for the manifest file, which may include data for joining a multicast group (such as a multicast group IP address) or for receiving a broadcast (e.g., data for joining a broadcast domain or VLAN).

At times, a user of the client device UE may interact with the web application APP using user interfaces of the client device UE, such as a keyboard, mouse, stylus, touchscreen interface, buttons, or other interfaces, to request multimedia content, such as the multimedia content MCNT. In response to such requests from a user, the web application APP may select one of representations based on, e.g., decoding and rendering capabilities of the client device UE. To retrieve data of the selected one of representations, the web application APP may sequentially request specific byte ranges of the selected one of representations. In this manner, rather than receiving a full file through one request, the web application APP may sequentially receive portions of a file through multiple requests.

As noted above, the representations may include video data of various coding and rendering characteristics. Representations of an adaptation set may have varying bitrates, which may allow for bandwidth adaptation. In conventional DASH techniques, this allows a client device to adapt to changing bandwidth availability by retrieving data from a representation having a bit rate that can be best accommodated by the current amount of available bandwidth.

Figure 3:
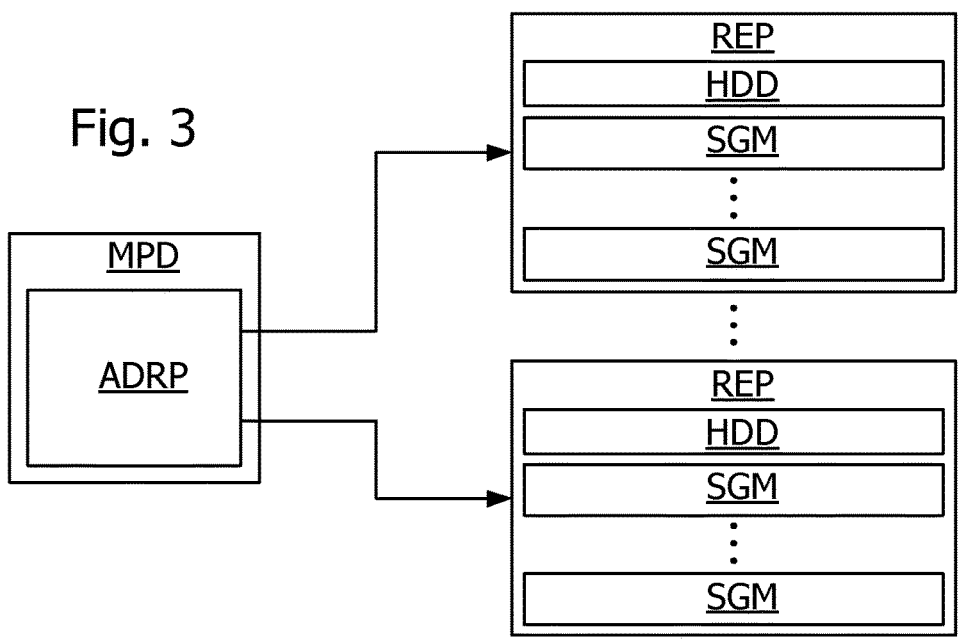
FIG. 3 is a block diagram illustrating elements of example media content.
Figure 4:
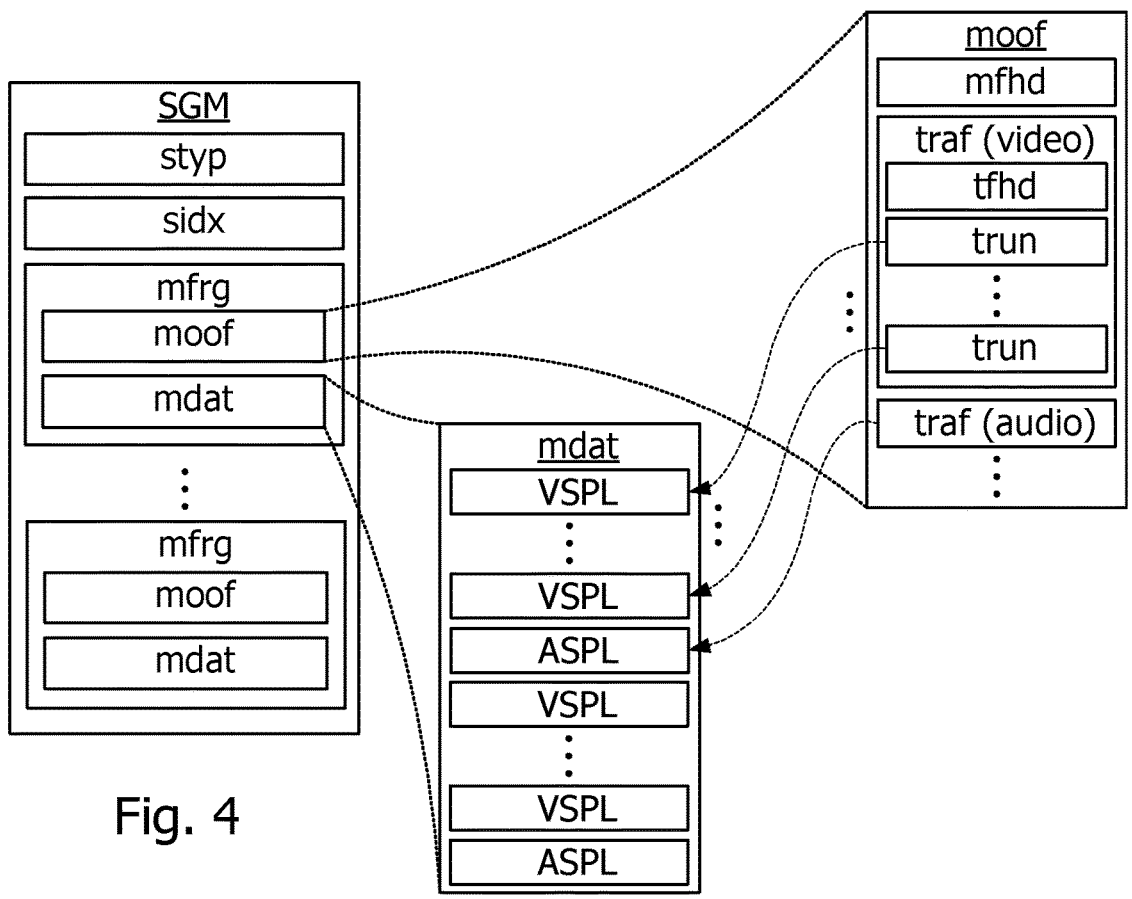
FIG. 4 is a block diagram illustrating an exemplary DASH multimedia segment.

FIG. 3 is a block diagram illustrating elements of example media content MCNT. In the example of FIG. 4, the multimedia content MCNT includes a media presentation description MPD and a plurality of representations REP. Each representation REP includes optional header data HDD and segments SGM. The media presentation description MPD may comprise a data structure separate from representations REP. In general, the media presentation description MPD may include data that generally describes characteristics of representations REP, such as coding and rendering characteristics (codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.), trick mode information (e.g., information indicative of representations that include temporal sub-sequences), and/or information for retrieving remote periods (e.g., for targeted advertisement insertion into media content during playback). Remote periods may also be referred to as external periods. The media presentation description MPD may include characteristics as described by the 3GPP Specification, with the addition of any or all of the signaled information described in this disclosure. As noted above, the media presentation description MPD may conform to a particular MPD profile. Thus the media presentation description MPD may include information indicative of a Multipurpose Internet Mail Extension (MIME) type for the media presentation description MPD and/or multimedia content MCNT.

The header data HDD, when present, may describe characteristics of segments SGM, e.g., temporal locations of random access points, which of segments SGM includes random access points, byte offsets to random access points within segments SGM, uniform resource locators (URLs) of segments SGM, or other aspects of segments SGM. Additionally or alternatively, such characteristics may be fully included within the media presentation description MPD.

The segments SGM include one or more coded video samples, each of which may include frames or slices of video data. Each of the coded video samples of the segments SGM may have similar characteristics, e.g., height, width, and bandwidth requirements. Such characteristics may be described by data of the media presentation description MPD. Each of the segments SGM may be associated with a unique uniform resource identifier (URI), e.g., a uniform resource locator (URL). Thus, each of the segments SGM may be independently retrievable using a streaming network protocol, such as DASH. In this manner, a destination device, such as the client device UE, may use an HTTP GET request to retrieve the segments SGM.

FIG. 4 is a block diagram illustrating an exemplary DASH multimedia file segment SGM. The DASH protocol may be used to carry video or audio media content in DASH multimedia file segments SGM. Video and audio media content may be multiplexed in the same DASH multimedia file segment. DASH multimedia file segments SGM may contain the following fields or boxes:

TABLE 1

| Boxes names (in hierarchical order) | | | Description of boxes |
|---|---|---|---|
| styp | | | Segment type |
| sidx | | | Segment index |
| moof | | | Movie fragment |
| | mfhd | | Movie fragment header |
| | traf | | Track fragment |
| | | tfhd | Track fragment header |
| | | trun | Track fragment run |
| mdat | | | Media data container |
| mfra | | | Movie fragment random access |
| | tfra | | Track fragment random access |
| | mfro | | Movie fragment random access offset |

According to ISOBMFF format, boxes start with a header that describes a size and type. The header may permit compact or extended sizes (e.g., 32 or 64 bits) and compact or extended types (e.g., 32 bits or full Universal Unique Identifiers (UUIDs)). Most boxes, including standard boxes, may use compact types (32 bit). In one configuration, the media data container boxes mdat may be the only boxes that use the 64-bit size. The size is the size of the entire box, including the header, fields, and contained boxes. This may facilitate general parsing of the file.

The movie fragment boxes moof and mdat form a movie fragment box mfrg as the box mdat may contain the media content of one movie fragment described in the associated box moof. The box mdat may contain video samples VSPL and audio samples ASPL. In video streaming, for example, there may be only one pair of boxes moof and mdat in a file segment.

The movie fragment random access box mfra may provide a table that may assist the client device UE in finding random access points in the DASH multimedia file segment SGM using movie fragments. It may contain a track fragment random access box tfra for each track provided (which may not be all tracks). This may be useful if the prior file segment SGM is damaged or when playback begins in the middle of a streaming video. The box mfra may be placed at or near the end of the file segment SGM. The last box within the box mfra may provide a copy of the length field.

One or more FLUTE packets FP may be damaged during the transmission process. The file receiver FREC may use error-correction techniques to attempt to recover the damaged packets. An example of these techniques which may be implemented by the file receiver FREC may consist in sending several occurrences of each File Delivery Table (FDT) and using forward error correction FEC. Several FEC schemes are available, including Raptor (described in IETF RFC 5053), RaptorQ (described in IETF RFC 6330), etc. In each FEC schemes, the network interface FSND may transmit FEC repair symbols in addition to FEC source symbols. FEC source symbols may include portions of the DASH multimedia file segment. FEC repair symbols may include additional data that may be used to repair damaged FEC source symbols. The file receiver FREC may attempt to recover the damaged FEC source symbols using the FEC repair symbols. In another configuration, a recovery scheme that avoids FEC encoding and decoding may be used to reduce the processing delay, such as Compact No-Code FEC (described in IETF RFC 3695).

However, it might happen that the file receiver FREC is unable to recover a DASH multimedia file segment SGM or a part thereof after FEC. This in turn may result in media content freezing or blanking during playback by the player AP, VP. This may be a disadvantage of DASH-based streaming; namely, the loss of a part, even a single byte, of one FLUTE packet FP may cause the loss of a whole file segment SGM. Further, although FEC may be used to improve overall performance, a client device UE may still not receive enough symbols to successfully decode a multimedia file segment SGM.

Figure 5:
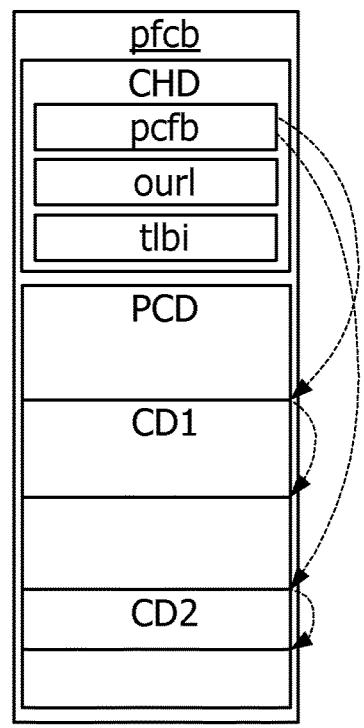
FIG. 5 is a block diagram illustrating a container box encapsulating corrupted data, according to an embodiment.

According to an embodiment, the file receiver FREC is configured to detect corrupted data when the FEC decoder does not succeed to correct transmission errors using FEC. The file receiver FREC is further configured to encapsulate a box moof or mdat detected as corrupted into a specific container box. The corrupted box may be totally or partially corrupted. An example of a container box pfcb encapsulating corrupted data is shown in FIG. 5. The container box pfcb comprises a header CHD and a payload PCD containing the corrupted box moof or mdat. The header contains a box identifier, a size of the block, a box pcfb containing index and size data for locating corrupted data CD1, CD2 (and thus non-corrupted data) in the corrupted box. The corrupted data CD1, CD2 may be present or absent in the payload PCD, or replaced by padding bits (e.g. a number of "0" or "1" corresponding to the size of the corrupted data). If the corrupted data are located in a box mdat, it may be thus possible to recover non-corrupted video or audio samples VSPL, ASPL contained in the box mdat.

The header CHD of the container box pfcb may also include a source URL box ourl specifying an URL where the corrupted file segment SGM containing the partially corrupted box moof or mdat can be found. The URL in the box ourl may be used to request the corrupted segment again.

The header CHD may also include a box tlbi specifying access points or indexes of all the movie fragments mfrg (including one box moof and one box mdat) of the file segment SGM containing the corrupted data CD1, CD2. The access points specified in the box tlbi may be extracted by the receiver FREC from the corresponding FLUTE File Delivery Table FDT received with the file segment SGM. The indexes of all the movie fragments mfrg in a transmitted file segment SGM may be inserted in the table FDT of the segment by the server MBMS, and more particularly, by the network interface FSND.

Each movie fragment mfrg in a file segment SGM specifies its size in bytes, and consequently defines the position of the following movie fragment mfrg. When a fragment mfrg and in particular the sizes of the fragment is corrupted, it is no more possible to determine the position of a next movie fragment mfrg following a corrupted movie fragment mfrg in the corrupted file segment SGM. Thanks to the access points specified the box tlbi, the non-corrupted movie fragments mfrg following a corrupted movie fragment in the corrupted file segment SGM may be retrieved.

The indexes inserted in the table FDT enable some existing receivers to remove corrupted movie fragments. In cases where the receiver acts as a Proxy DASH server for a DASH player, the receiver may remove any corrupted movie fragment containing errors and create a new segment which excludes these corrupted fragments. The new incomplete segment can be further processed by the DASH player. The addition of the container box pfcb encapsulating a corrupted fragment would not disturb this operating mode since the container box pfcb would not be recognized by the existing receivers and thus would be rejected as a corrupted fragment.

Parsers of file readers e.g. the decapsulation unit DECM, which do not support this container box will not recognize it and reject it, falling back to the current behaviour whereby a complete file segment is lost.

The container box pfcb is designed for fast encapsulation of corrupted data (simple appending of bytes), and for not breaking existing parsers not aware of the existence of such container box. The container box pfcb which is not present in the original file segments, is typically inserted upon partial reception of a file. The container box pfcb may be specified in SDL (Syntax Description Language) as follows:

```
aligned(8) class PartialFileContainerBox extends Box('pfcb') {
    TopLevelBoxIndexBox toplevel;            //optional
    OriginalSourceURLBox source_url;         //optional
    PartiallyCorruptedFileBox corrupted_ranges;  //mandatory
    unsigned int(8) file_data[ ];            //until end of box
}
``` where:
"toplevel" is a box tlbi which specifies indexes of fragment boxes mfrg present in the source file segment SGM. The box tlbi may be absent.
"source_url" is a source URL box ourl which specifies the original URL of the file segment before corruption. If present, it may be used by file readers to repair the file. The box ourl may be absent.
"corrupted_ranges" is a box pcfb describing invalid ranges in the payload PCD. The box pcfb is necessary present in a box pfcb.
"file_data" is the payload PCD containing the corrupted fragment mfrg. File readers aware of partial box processing may parse the payload PCD as a regular ISOBMFF file with potential corrupted byte ranges specified by the box pfcb.

The corrupted range box pcfb may be specified in SDL as follows:

```
aligned(8) class PartiallyCorruptedFileBox
    extends FullBox('pcfb', version, flags) {
    if (version==1) {
        unsigned int(64) source_byte_offset;
    } else {
        unsigned int(32) source_byte_offset;
    }
    unsigned int(32) entry_count;
    for (i=0; i < entry_count; i++) {
        if (version==1) {
            unsigned int(64) byte_offset;
        } else {
            unsigned int(32) byte_offset;
        }
        unsigned int(32) corrupted_size;
    }
}
``` where:
"version" specifies a version of this box.
"flags" specifies the following flag for this box: PCFB_NOT_PADDED=0x000001
"source_byte_offset" specifies the byte offset in the source file of the first byte of the payload PCD of the parent box pfcb. It is usually 0 when the box encapsulates a complete file or movie segment, but can be different for cases where the box encapsulates only corrupted movie fragments of a movie segment. This offset is typically used when reconstructing the corrupted movie fragment.
"entry_count" specifies a number of corrupted byte ranges present in the payload PCD of the parent box pfcb.
"byte_offset" specifies a byte offset, starting from the first byte of the payload PCD of the parent box pfcb, of the start of the corrupted range in the payload PCD. If version 1 is specified, 64 bit data offsets are used. Otherwise 32 bit data offsets are used. If PCFB_NOT_PADDED is set, each of the corrupted byte range is not present in the payload PCD of the parent box pfcb. Otherwise, the corrupted data are in the payload PCD of the parent box pfcb.
"corrupted_size" specifies the size of the corrupted data range in the payload PCD.
"for (i=0; i<entry_count; i++)" indicates that there are one "byte_offset" and one corresponding "corrupted_size" for each one of the "entry_count" corrupted byte ranges.

When a payload PCD is not padded, a file reader (e.g. the decapsulation unit DECM) may either pad the corrupted data range when parsing the file or adjust its box parsing and data offsets handling.

The box tlbi is used to indicate one or several top-level (file level) box offsets in the original file segment. This box can be extracted from the table FDT of a FLUTE session. This box allows a file reader to resynchronize box parsing in case of corrupted data impacting one of the boxes moov in the original file segment. The container box tlbi may be specified in SDL as follows:

```
aligned(8) class TopLevelBoxIndexBox extends FullBox('tlbi', version, 0)
{
    unsigned int(32) entry_count;
    for (i=0; i < entry_count; i++) {
        if (version==1) {
            unsigned int(64) box_offset;
        } else {
            unsigned int(32) box_offset;
        }
    }
}
``` where:
"version" specifies the version of this box.
"entry_count" specifies a number of fragment boxes mfrg present in the original file segment.
"box offset" specifies the byte offset, starting from the first byte of the payload PCD of the parent box pfcb, of a fragment box mfrg present in the original file segment. This offset can be used to resynchronize parsing after data loss. If version 1 is used, 64 bit data offsets are used. Otherwise 32 bit data offsets are used.

The box ourl is used to indicate the source URL of the file before corruption. It is typically inserted in the pfcb box by the file receiver, and can be used by a file reader to repair the file. The container box ourl may be specified in SDL as follows:

```
aligned(8) class OriginalSourceURLBox extends FullBox('ourl', 0, 0) {
    string url;
}
``` where:
"url" specifies the source URL where the corrupted file was retrieved from. This may identify the physical network or an alternative URL where the file can be found.

According to an embodiment, a new attribute type may be defined and a new attribute of this attribute type may be added to the type FileType into the FLUTE XML-schema of the structure of the table FDT. This attribute called "IndependentUnitLocations" or "RandomAccessLocation" represents a non-empty list of byte locations, each of which is the location of the first byte of an independent unit (typically the locations of the boxes moof). In case of a MPEG4 file, it will carry different values contained into the box tlbi. The new attribute type (IndependentUnitLocations-Type or RandomAccessLocation-Type) may be defined in the XML-schema of the table FDT structure as follows:

```
<xs:schema
...
    <xs:attribute name="IndependentUnitLocations" type=
        "IndependentUnitLocations-Type"/>
        <xs:simpleType name="IndependentUnitLocations-Type">
        <xs:list itemType="xs:unsignedLong"/>
    </xs:simpleType>
</xs:schema>
```

A new attribute (IndependentUnitLocations) may be defined in the XML-schema of the table FDT as follows:

```
<xs:schema
...
<xs:complexType name="FDT-InstanceType">
    ...
    <xs:attribute ref="mbms2015: IndependentUnitLocations"
                                        use="optional"/>
</xs:complexType>
</xs:schema>
``` where "IndependentUnitLocations" may be replaced with "RandomAccessLocation".

An independent unit is the chunk of bytes between two consecutive entries in the IndependentUnitLocations list, except for the last independent unit which ranges from the last entry in the list to the end of the file (for instance a file segment). When the attribute IndependentUnitLocations is present, it means that the file is composed of independent units. A file is composed of independent units if, after a file is created from the original file by removing one or more independent units:
a) the remaining independent units can be processed;
b) the file that is created can still be processed as a file of the given type, i.e. that any in-order concatenation of any non-empty set of independent units is a valid data unit.

If any non-recoverable loss occurs in a file, it is possible to create a new file by removing those independent units which are missing one or more bytes. If this technique is used, MBMS application must be made aware that the file is incomplete.

Thus the locations of the boxes moof of a file segment SGM may be inserted in the table FDT at the transmitted side by the network interface FSND, and retrieved from the table FDT. If corrupted data are detected and encapsulated in a container box pfcb, at the receiver side, the locations of the boxes moof in the file segment SGM are inserted in the container box pfcb.

The list of location data of the boxes moof in a file segment SGM may be updated during an update of a table FDT for a single movie. This allows progressive recovery of parsing points at the receiver side without having to wait for the entire list of offsets, which is only known once the whole file segment is received and produced from the FLUTE packets. By progressively building this list, it is possible to combine low latency sending of the segment subdivided into movie fragments and error recovery techniques enabled by encapsulating corrupted data as disclosed above. Thus the receiver will be able to forward the movie fragment immediately after it is received if no corrupted data are detected, or wait for the updated list of offsets to recover otherwise, and by encapsulating the corrupted movie fragment(s) in a box pfcb indicating (in the box tlbi) the corrupted byte ranges and original byte offsets of the movie fragments in the movie segment. When the tables FDT are refreshed at a refresh rate close to the movie fragment playing duration, the error recovery mechanism introduces no delay.

In one or more examples, the systems and methods described may apply to other content than multimedia content, transmitted in files.

In one or more examples, embodiments may relate to a method of retrieving file data, the method comprising:
retrieving a portion of a content transmitted in accordance with a multicast protocol via a file delivery service;
detecting corrupted data in the portion of the content; and
encapsulating the media content portion into a container box, the container box having header data and payload data including the content portion, the header data comprising location data for locating the corrupted data in the media content portion.

According to an embodiment, the method comprises receiving the container box, determining a type of the container box from the header data, the type of the container box indicating that the container box contains corrupted data; determining location data in the header data; determining from the location data in the header data locations of non-corrupted data of the content portion in the payload data; and using the non-corrupted data.

According to an embodiment, the content comprises data fragments forming a file segment, and the content portion containing corrupted data is a data fragment.

According to an embodiment, the method comprises inserting into the header data of the container box containing the corrupted data, location attributes indicating locations of the data fragments in the file segment.

According to an embodiment, the method comprises inserting into the header data of the container box containing the corrupted data, a location address where the file segment is available for downloading.

According to an embodiment, the file contains data transmitted according to an adaptive data streaming network protocol such as dynamic adaptive streaming over HTTP (DASH).

According to an embodiment, the file delivery service comprises File Delivery over Unidirectional Transport (FLUTE), the method further comprising receiving a file delivery table (FDT) from the file delivery service, and data packets forming a file segment comprising data fragments.

According to an embodiment, the method comprises reading in the file delivery table location attributes indicating locations of the data fragments in the file segment; and inserting the location attributes indicating the locations of the data fragments in the header data of the container box.

Figure 6:
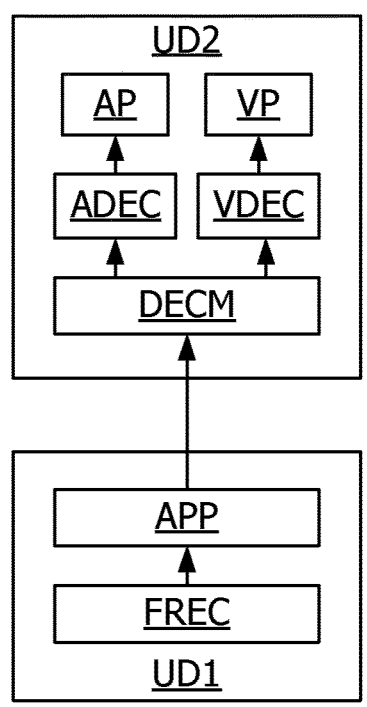
FIG. 6 is a block diagram of a user equipment according to another embodiment.

In one or more examples, the systems described may comprise as shown in FIG. 6 a first user device UD1 comprising the file receiver FREC and the web application APP, and a second user device UD2 in communication with the device UD1 and comprising the decapsulation unit DECM, and content decoders and players such as the audio and video decoders ADEC, VDEC and the audio and video players AP, VP. Thus embodiments may relate to a user device (UD2) configured to:

receive a file comprising data fragments, one data fragment being encapsulated into a container box comprising payload data including corrupted data, and header data including location data for locating the corrupted data and non-corrupted data in the payload data; determine a type of the container box from the header data, the type of the container box indicating that the container box contains corrupted data; determine location data in the header data; locating non-corrupted data in the payload data using the location data in the header data; and use the non-corrupted data.

This user device may also be configured to: read location attributes in the header data of the container box; and using the location attributes to retrieve the data fragments in the file; and use data in the retrieved data fragments.

This user device may also be configured to read in the header data of the container box containing the corrupted data, a location address where the file is available for downloading, and request the file a at the location address.

This user device may also be configured to receive files transmitted according to an adaptive data streaming network protocol such as dynamic adaptive streaming over HTTP (DASH).

Embodiments may also relate to a method implemented by this user device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to tangible computer-readable storage media which is non-transitory or a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors, general purpose microprocessors, application specific integrated circuits, field programmable logic arrays, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

The invention claimed is:

1. A method of retrieving data, the method comprising:
receiving, by a user device via a data transmission network, a file portion transmitted in accordance with a multicast protocol from a file delivery service linked to the data transmission network, the received file portion including data fragments that are independently processable, the receiving including receiving packets of symbols and generating each data fragment in the received file portion by (i) decoding the received packets of symbols, and (ii) when the received packets of symbols include repair symbols, processing transmission errors using the transmitted repair symbols;
receiving, by the user device, a file delivery table (FDT) from the file delivery service;
reading, by the user device, in the file delivery table, location information indicating locations of the data fragments in the received file portion; and
determining, by the user device, from the read location information, a corrupted data fragment present in the data fragments of the received file portion.

2. The method of claim 1, further comprising:
detecting, by the user device, corrupted data in the data fragments of the received file portion; and
removing, by the user device, from the received file portion, one data fragment, of the data fragments of the received file portion, containing the detected corrupted data.

3. The method of claim 1, further comprising:
  detecting, by the user device, corrupted data in the data fragments of the received file portion; and
  encapsulating, by the user device, a data fragment containing the detected corrupted data into a container box including payload data including the corrupted data fragment containing the detected corrupted data, and header data including location data for locating the corrupted data in the corrupted data fragment.

4. The method of claim 3, further comprising:
  determining, by the user device, a type of the container box from the header data, the type of the container box indicating that the container box contains corrupted data;
  determining, by the user device, location data in the header data;
  determining, by the user device, from the location data in the header data, data locations of non-corrupted data in the payload data; and
  using, by the user device, the non-corrupted data.

5. The method of claim 3, further comprising inserting, by the user device, into the header data of the container box containing the corrupted data, the location information read in the file delivery table.

6. The method of claim 5, further comprising:
  reading, by the user device, the location information in the header data of the container box;
  using the location information to retrieve the data fragments in the file; and
  using, by the user device, data in the retrieved data fragments.

7. The method of claim 3, further comprising inserting, by the user device, into the header data of the container box containing the corrupted data, a location address where the file is available for downloading.

8. The method of claim 1, wherein the file portion is transmitted to the user device according to dynamic adaptive streaming over HTTP (DASH).

9. The method of claim 1, wherein the file delivery service comprises File Delivery over Unidirectional Transport (FLUTE).

10. A user device comprising a data receiver configured to:
  receive via a data transmission network, a file portion transmitted in accordance with a multicast protocol from a file delivery service linked to the data transmission network, the file being divided into data fragments that are independently processable, the receiving including receiving packets of symbols and generating each data fragment in the received file portion by (i) decoding the received packets of symbols, and (ii) when the received packets of symbols include repair symbols, processing transmission errors using the transmitted repair symbols;
  receive a file delivery table (FDT) from the file delivery service;
  read, in the file delivery table, location information indicating locations of the data fragments in the received file portion; and
  determine, from the location information, a non-corrupted data fragment present in the data fragments of the received file portion.

11. The user device of claim 10, wherein the data receiver is further configured to:
  detect corrupted data in the data fragments of the received file portion; and
  remove from the received file portion, a data fragment containing the detected corrupted data.

12. The user device of claim 10, wherein the data receiver is further configured to:
  detect corrupted data in the data fragments of the received file portion; and
  encapsulate a data fragment containing the detected corrupted data into a container box comprising payload data including with the data fragment containing the detected corrupted data, and header data including location data for locating the corrupted data in the data fragment.

13. The user device of claim 12, wherein the data receiver is further configured to:
  determine a type of the container box from the header data, the type of the container box indicating that the container box contains corrupted data;
  determine location data in the header data;
  determine from the location data in the header, data locations of non-corrupted data in the payload data; and
  using, by the user device, the non-corrupted data.

14. The user device of claim 12, wherein the data receiver is further configured to insert into the header data of the container box containing the corrupted data, the location information read in the file delivery table.

15. The user device of claim 14, wherein the data receiver is further configured to:
  read the location information in the header data of the container box;
  use the location information to retrieve the data fragments in the file; and
  use data in the retrieved data fragments.

16. The user device of claim 12, wherein the data receiver is further configured to:
  insert into the header data of the container box containing the corrupted data, a location address where the file is available for downloading.

17. The user device of claim 10, wherein the data receiver is further configured to receive the file portion according to dynamic adaptive streaming over HTTP (DASH).

18. The user device of claim 10, wherein the file delivery service comprises File Delivery over Unidirectional Transport (FLUTE).

* * * * *